(12) United States Patent
Francis

(10) Patent No.: US 12,222,109 B1
(45) Date of Patent: Feb. 11, 2025

(54) HEATER DOLLY

(71) Applicant: Mitchell J. Francis, Beverly Hills, CA (US)

(72) Inventor: Mitchell J. Francis, Beverly Hills, CA (US)

(*) Notice: Subject to any disclaimer, the term of this patent is extended or adjusted under 35 U.S.C. 154(b) by 0 days.

(21) Appl. No.: 18/642,193

(22) Filed: Apr. 22, 2024

Related U.S. Application Data

(63) Continuation of application No. 18/476,080, filed on Sep. 27, 2023.

(60) Provisional application No. 63/378,165, filed on Oct. 3, 2022.

(51) Int. Cl.
*B62B 3/04* (2006.01)
*B62B 3/10* (2006.01)
*F24C 15/08* (2006.01)

(52) U.S. Cl.
CPC .............. *F24C 15/083* (2013.01); *B62B 3/04* (2013.01); *B62B 3/10* (2013.01); *B62B 2301/04* (2013.01); *B62B 2301/05* (2013.01); *B62B 2301/08* (2013.01)

(58) Field of Classification Search
CPC . F24C 15/083; B62B 3/04; B62B 3/10; B62B 2301/04; B62B 2301/05; B62B 2301/08
See application file for complete search history.

(56) References Cited

U.S. PATENT DOCUMENTS

| | | | |
|---|---|---|---|
| 3,117,655 A | 1/1964 | Skupas et al. | |
| 3,320,703 A * | 5/1967 | Hawthorn | H01Q 1/1235 52/123.1 |
| 3,841,631 A | 10/1974 | Dolan | |
| 4,378,191 A | 3/1983 | Sato | |
| 5,060,907 A | 10/1991 | Castano | |
| 5,927,514 A * | 7/1999 | Linder | G12B 9/08 211/189 |
| 5,934,863 A | 8/1999 | Beck | |
| 6,135,467 A * | 10/2000 | Tagariello | B62B 3/104 280/79.5 |
| 6,367,494 B1 | 4/2002 | Tung | |
| 6,869,058 B2 | 3/2005 | Tung | |
| 7,347,428 B2 | 3/2008 | Edenso | |
| 7,845,656 B2 * | 12/2010 | Thompson | B25H 3/00 280/47.35 |
| 8,029,006 B2 * | 10/2011 | Kalajyan | B62B 3/16 280/651 |
| 8,256,778 B1 * | 9/2012 | Morad | A47L 13/58 280/47.35 |
| 8,833,709 B2 | 9/2014 | Weng | |

(Continued)

FOREIGN PATENT DOCUMENTS

| | | |
|---|---|---|
| CH | 682975 A5 | 12/1993 |
| CN | 201513683 U | 6/2010 |

(Continued)

*Primary Examiner* — Bryan A Evans
(74) *Attorney, Agent, or Firm* — Welsh Flaxman & Gitler LLC

(57) ABSTRACT

A heater dolly for use with an outdoor patio heater includes a platform assembly and a retention assembly constructed to extend between the platform assembly and the outdoor patio heater in a manner providing additional support and ensuring that the outdoor patio heater and platform assembly are securely connected to enhance stability of the outdoor patio heater as it sits upon the heater dolly.

10 Claims, 5 Drawing Sheets

(56) References Cited

U.S. PATENT DOCUMENTS

| | | |
|---|---|---|
| 8,910,957 B1 | 12/2014 | Hassell |
| 8,960,625 B2 | 2/2015 | Ma |
| 9,192,266 B2 | 11/2015 | Starr et al. |
| 9,358,995 B2 | 6/2016 | Allos et al. |
| 10,017,955 B2 | 7/2018 | Ye |
| 10,100,969 B1 | 10/2018 | Zhu et al. |
| 10,286,943 B1 * | 5/2019 | Greenblatt ............. B65D 19/42 |
| 10,857,930 B1 * | 12/2020 | Levi ........................ B60P 7/083 |
| 11,260,992 B1 | 3/2022 | Wiskus |
| 11,629,520 B1 | 4/2023 | Geraghty |
| 2001/0024026 A1 | 9/2001 | Knutsson |
| 2003/0002968 A1 | 1/2003 | Nance |
| 2004/0123887 A1 | 7/2004 | Naber |
| 2005/0002767 A1 | 1/2005 | Oosterhouse |
| 2005/0036870 A1 | 2/2005 | Johansen |
| 2005/0205727 A1 | 9/2005 | Nerger |
| 2006/0054206 A1 | 3/2006 | Bilotti |
| 2017/0114563 A1 | 4/2017 | Ye |
| 2018/0212414 A1 | 7/2018 | Behr |
| 2019/0376307 A1 | 12/2019 | Zhu et al. |
| 2020/0015557 A1 | 1/2020 | Shen et al. |

FOREIGN PATENT DOCUMENTS

| | | |
|---|---|---|
| CN | 216636588 U | 5/2022 |
| EP | 1692933 A1 | 2/2006 |
| NZ | 234624 A | 1/1993 |

* cited by examiner

HEATER DOLLY

CROSS-REFERENCE TO RELATED APPLICATIONS

This application is a continuation of U.S. patent application Ser. No. 18/476,080, entitled "HEATER DOLLY," filed Sep. 27, 2023, which claims the benefit of U.S. Provisional Application Ser. No. 63/378,165, entitled "HEATER DOLLY," filed Oct. 3, 2022, both of which are incorporated herein by reference.

BACKGROUND OF THE INVENTION

1. Field of the Invention

The present invention relates to a heater dolly.

2. Description of the Related Art

Outdoor patio heaters have been sold for both residential and business use, and their use has substantially increased recently as people look for ways in which to spend time outdoors. Outdoor patio heaters are very useful, but they are difficult and oftentimes dangerous to move.

SUMMARY OF THE INVENTION

In one aspect a heater dolly for use with an outdoor patio heater includes a platform assembly and a retention assembly constructed to extend between the platform assembly and the outdoor patio heater in a manner providing additional support and ensuring that the outdoor patio heater and platform assembly are securely connected to enhance stability of the outdoor patio heater as it sits upon the heater dolly.

In some embodiments the platform assembly includes a central support platform.

In some embodiments the central support platform includes a plurality of downwardly extending lockable caster wheels secured to the lower surface thereof.

In some embodiments at least one nonlocking swivel caster wheel is secured to the lower surface of the central support platform.

In some embodiments the central support platform includes an upper surface, a lower surface, and a sidewall extending between the upper surface and the lower surface.

In some embodiments the central support platform is of a one-piece construction.

In some embodiments the central support platform includes a substantially circular central portion from which a plurality of support arms, which have a triangular shape, extend.

In some embodiments each of the plurality of support arms includes a wide first end coextensive with a central portion and a narrow second end at an apex of a triangle defined by the respective support arms.

In some embodiments the respective ends of each anchoring member are coextensive with side walls of respective support arms adjacent a second end thereof.

In some embodiments the central support platform includes five support arms.

In some embodiments the central support platform includes a series of anchoring members for engagement with the retention assembly.

In some embodiments each of the anchoring members includes an upper surface and a lower surface, wherein the upper and lower surfaces are connected by an interior side wall and an exterior side wall.

In some embodiments the anchoring members are arcuate anchoring members extending between support arms of the central support platform, the arcuate anchoring members provide an anchoring point for attachment of straps of the retention assembly.

In some embodiments the retention assembly includes a collar member shaped and dimensioned for secure attachment to the outdoor patio heater and the platform assembly.

In some embodiments the collar member is annular and includes an inner surface that directly engages the outdoor patio heater and an outer surface facing away from the outdoor patio heater.

In some embodiments the collar member includes arcuate first and second collar segments. Each of the first and second collar segments is provided with opposed end members that mate with respective end members of the other collar segment when the first and second collar segments are positioned about the outdoor patio heater.

In some embodiments the retention assembly further includes straps and D-rings are secured to the outer surface of the first and second collar segments to provide a mounting structure for the straps of the retention assembly.

In some embodiments the retention assembly further includes a plurality of straps extending from an outer surface of the collar member.

In some embodiments each of the plurality of straps includes a first end secured to the collar member and a second end adapted for attachment to, and adjustment relative to, the platform assembly.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
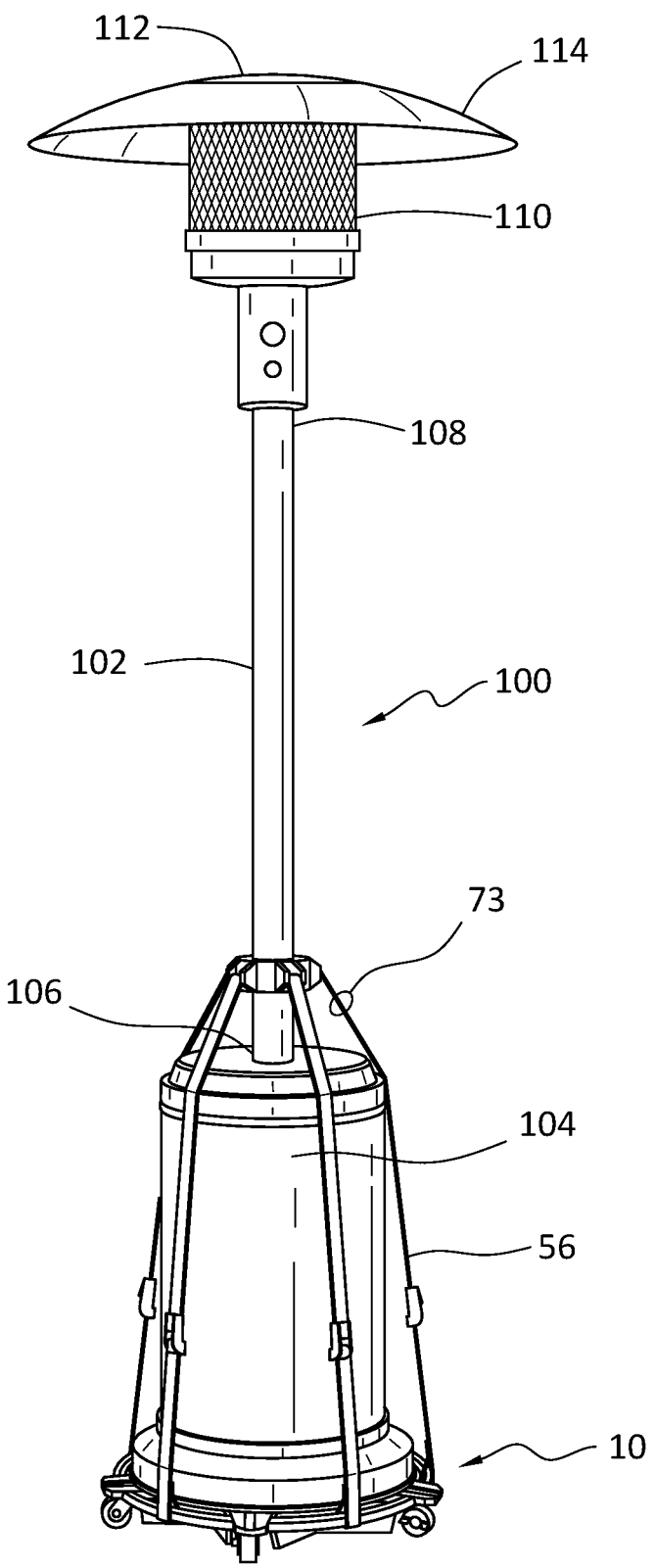
FIG. 1 is a left perspective view of the heater dolly.
Figure 2:
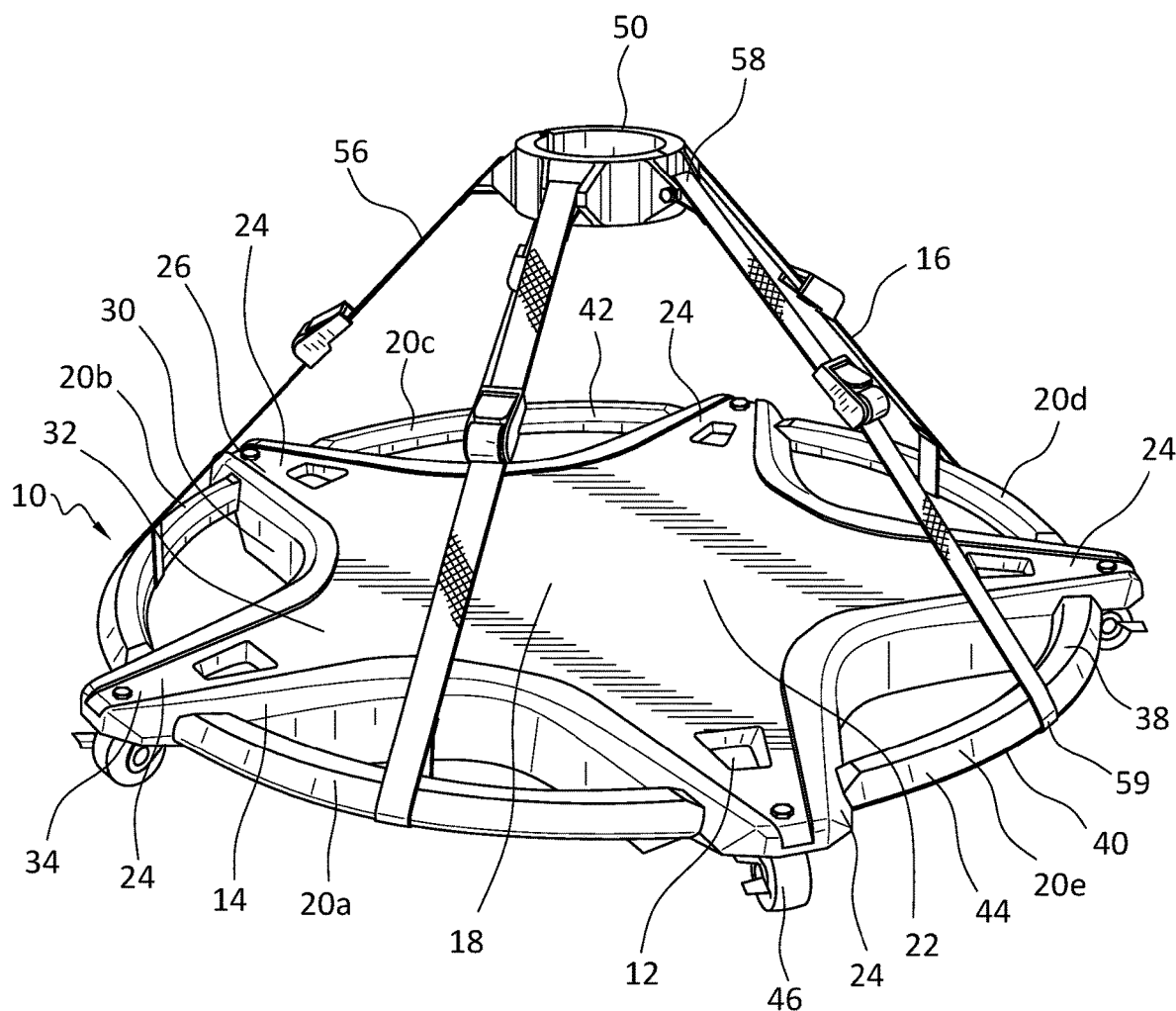
FIG. 2 is a detailed top perspective view of the heater dolly with the heater removed.
Figure 3:
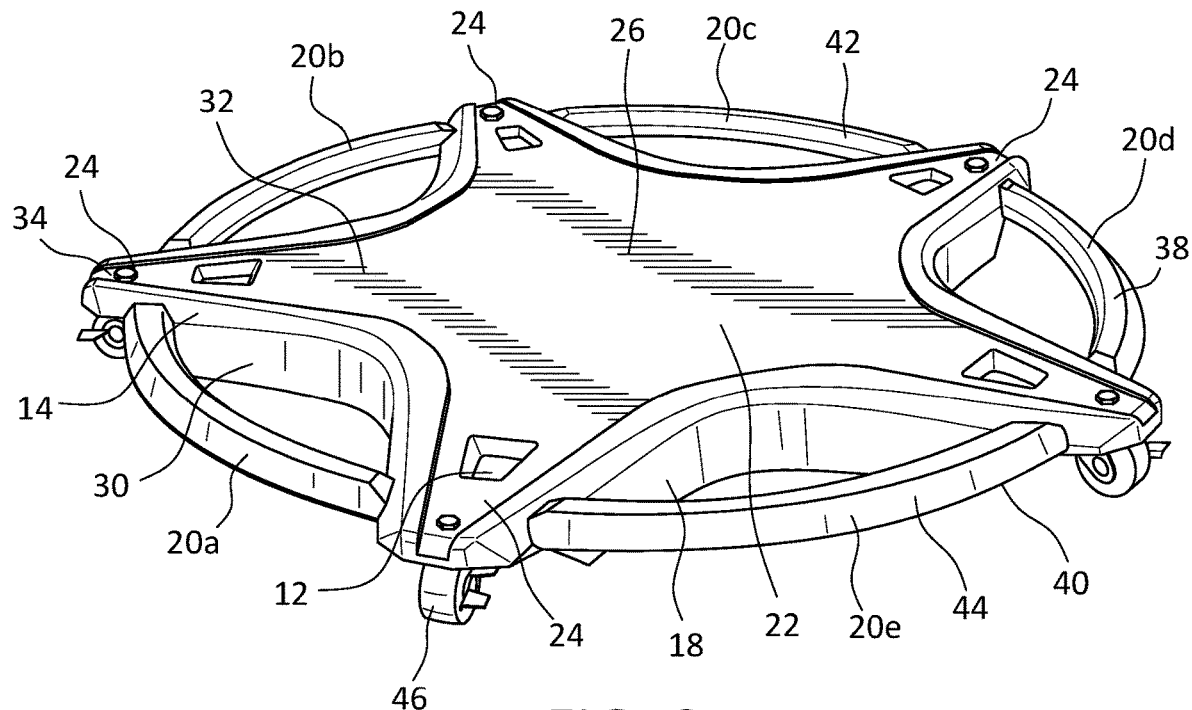
FIG. 3 is a detailed top perspective view of the heater dolly with the heater and retention assembly removed.
Figure 4:
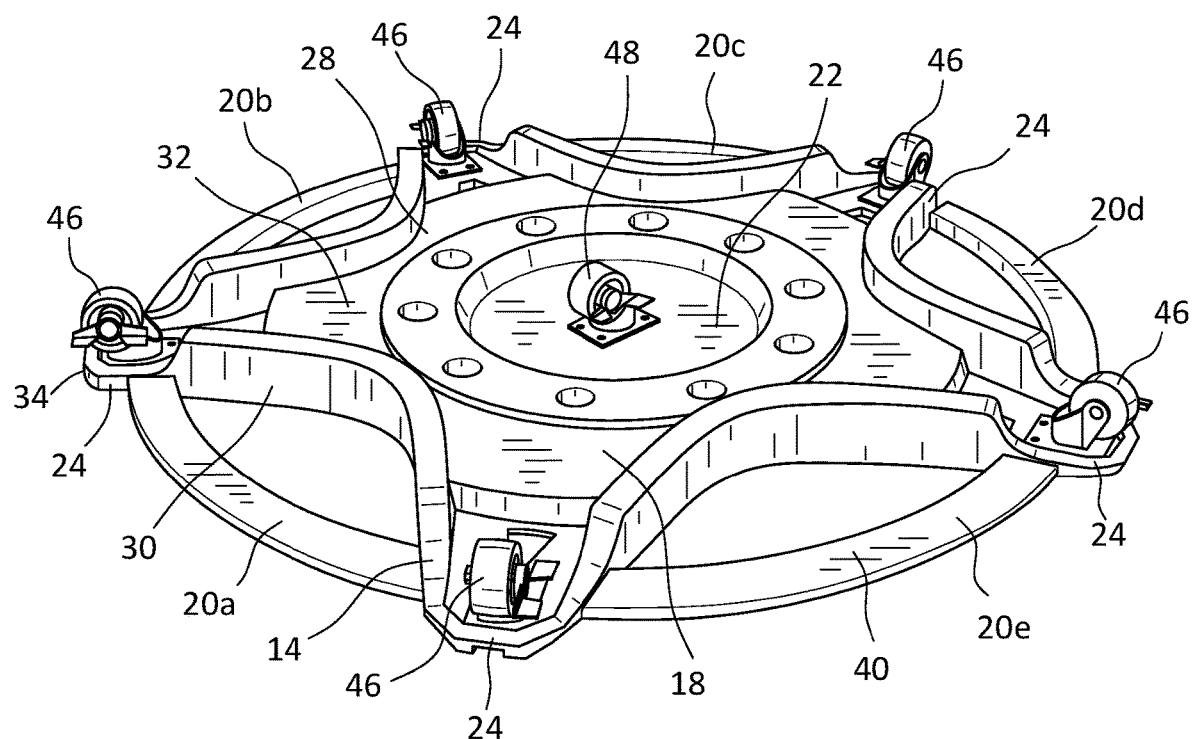
FIG. 4 is a detailed bottom perspective view of the heater dolly with the heater and retention assembly removed.
Figure 5:
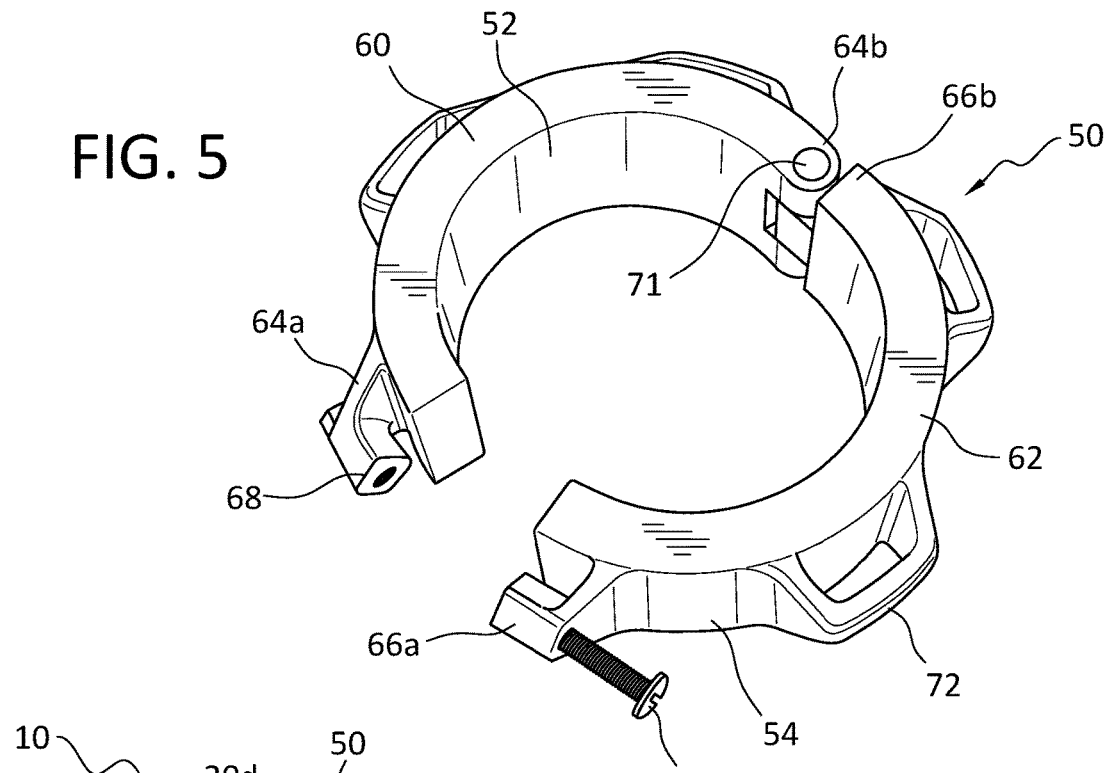
FIG. 5 is a perspective view of the collar member.
Figure 6:
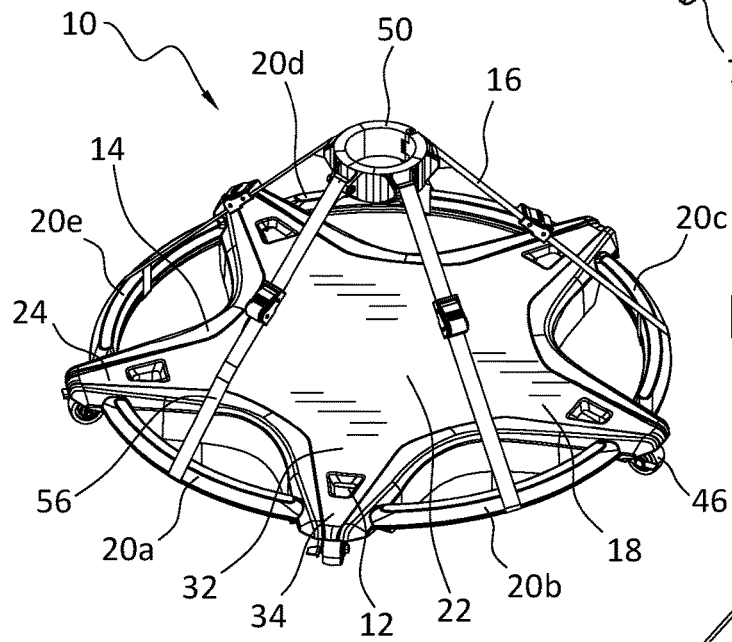
FIGS. 6, 7, 8, and 9 are respectively a perspective view, a side view, a bottom view, and a top view of the heater dolly.
Figure 7:
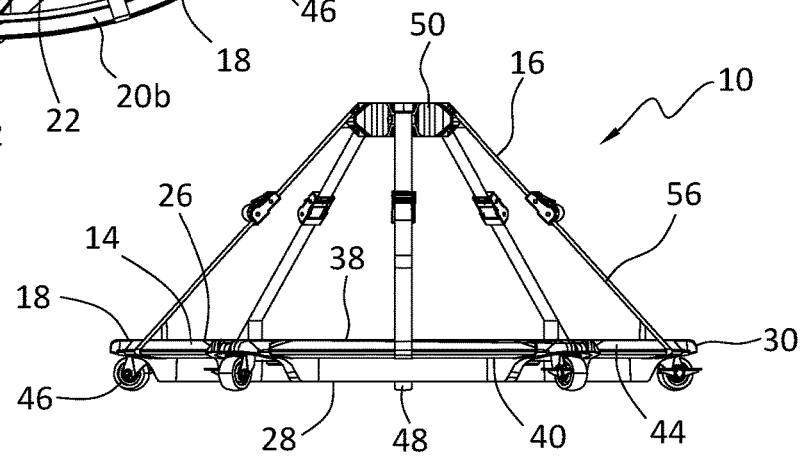
Figure 8:
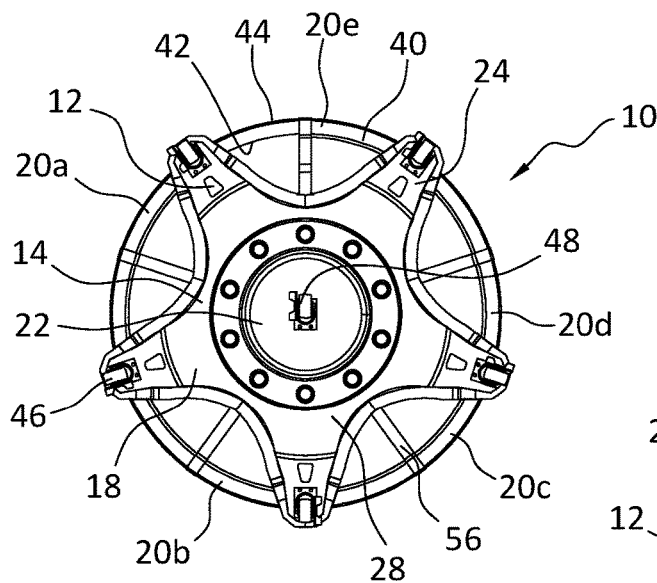
Figure 9:
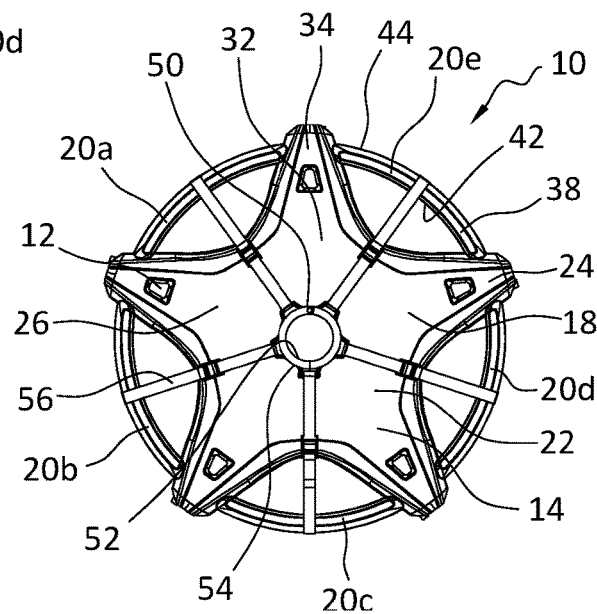

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 to 9, an embodiment of the heater dolly 10 in accordance with the present invention is disclosed. The embodiment of the heater dolly 10 disclosed with reference to FIGS. 1 to 9 is designed for a propane powered, outdoor patio heater 100 and its weighted base, which are to be assembled on top of the heater dolly 10 itself. As those skilled in the art will appreciate, outdoor patio heaters 100 are radiant heating appliances the generating heat for use in outdoor environments. There are a variety of such outdoor patio heaters, but one of the most popular is commonly called the "mushroom" or "umbrella" heater and is disclosed herein by way of example. The disclosed outdoor patio heater 100 includes the generally include a base 104 in which a propane tank (not shown) is stored. A shaft 102 extends upwardly from the base 104. The shaft 102 includes a first end 106 secured to the base 104 and a second end 108 to which the heat unit 110, cap 112 and directional heat shield 114 are secured. In use, propane from the propane tank flows under the control of the control unit to the heat unit 110 where the propane ignites to generate heat that is reflected for use by the cap 112 and the heat shield 114. While the heater dolly disclosed above is disclosed in conjunction with a mushroom or umbrella heater, it is appreciated the heater dolly could be similarly used in the support and movement of a variety of heating systems.

The heater dolly 10 of the present invention is at least 22 inches across, and is built to support loads far in excess of commercial heaters and propane tanks. The heater dolly 10 is further provided with drain holes 12 (or drain slopes), as well as an anti-tip and anti-slide-off structures that are discussed below in detail.

More particularly, the heater dolly 10 includes a platform assembly 14 upon which the outdoor patio heater 100 sits when fully assembled and in use. In fact, the heater dolly 10 is constructed such that the outdoor patio heater 100 is placed upon the platform assembly 14 of the heater dolly 10. The heater dolly 10 also includes a retention assembly 16 constructed to extend between the platform assembly 14 and the outdoor patio heater 100 in a manner providing additional support and ensuring that the outdoor patio heater 100 and platform assembly 14 are securely connected to enhance the stability of the outdoor patio heater 100 as it sits upon the heater dolly 10.

The platform assembly 14 includes a central support platform 18. The central support platform 18 includes a series of anchoring members 20a-20e for engagement with the retention assembly 16. As will be discussed below in greater detail and in accordance with a disclosed embodiment, the anchoring members 20a-20e are arcuate anchoring members extending between the support arms 24 of the central support platform 18. The arcuate anchoring members 20a-20e provide an anchoring point for attachment of the straps 56 of the retention assembly 16. The central support platform 18 includes a substantially circular central portion 22 from which a plurality of support arms 24, which have a triangular shape, extend. In accordance with a disclosed embodiment the central support platform 18 includes five (5) support arms 24. While five support arms are disclosed in the embodiment presented herein, it is appreciated four (4) or six (6), or some other number of support arms could be employed within the spirit of the present invention. Further, and as discussed below, the disclosed support arms 24 are substantially triangular shaped, although it is appreciated other shapes could be employed without departing from the spirit of the present invention. While the disclosed central support platform is of a particular shape, it is appreciated the shape thereof could be varied within the spirit of the present invention.

The central support platform 18 includes an upper surface 26, a lower surface 28, and a sidewall 30 extending between the upper surface 26 and the lower surface 28. Accordingly, each of the central portion 22 and the plurality of support arms 24 include respective upper surfaces, lower surfaces, and sidewalls. Further still, the central support platform 18 is of a one-piece construction and the central portion 22 and the plurality of support arms 24 are integrally formed.

Each of the plurality of support arms 24 includes a wide first end 32 coextensive with the central portion 22 and a narrow second end 34 at the apex of the triangle defined by the respective support arms 24. Secure attachment of each of the support arms 24 to the arcuate anchoring members 20a-20e is facilitated by integral molding of the arcuate anchoring members 20a-20e with the central support platform 18 such that the respective ends of each arcuate anchoring member 20a-20e are coextensive with side walls of respective support arms 24 adjacent the second end 34 thereof.

As briefly discussed above, each of the arcuate anchoring members 20a-20e defines an anchoring point for attachment of the retention assembly 16. Each of the arcuate anchoring members 20a-20e is constructed with a circular cross-sectional profile, although it is appreciated other cross-sectional profiles could be employed without departing from the spirit of the present invention. Each of the arcuate anchoring members 20a-20e includes an upper surface 38 and a lower surface 40. The upper and lower surfaces 38, 40 are connected by an interior side wall 42 and an exterior side wall 44. While the arcuate anchoring members 20a-20e disclosed herein are of an arcuate configuration, it is appreciated other shapes may be used without departing from the spirit of the present invention. It should also be appreciated that the arcuate anchoring members of the disclosed embodiment are secured to the support arms at a position slightly short of the tip thereof, and the connection point of the arcuate anchoring members to the support arms could be pushed radially outward to the very tip of the support arms.

The central support platform 18, in particular, the support arms 24, also includes a plurality of downwardly extending lockable caster wheels 46 secured to the lower surface 28 thereof. In accordance with a disclosed embodiment, five (5) caster wheels 46 are secured to the central support platform 18 at equidistant positions about the circumference of the central support platform 18. In accordance with a disclosed embodiment, the caster wheels 46 are positioned at the second ends 34 of the support arms 24. Four bolts are used to secure each caster to each support arm 24. By positioning the lockable swivel caster wheels 46 at the second ends 34 of the support arms 24, the lockable swivel caster wheels 46 extend the leverage point of the platform assembly 14, providing improved leverage and load distribution. The positioning of the lockable swivel caster wheels 46 at the second ends 34 of the support arms 24 also provides for ease of rolling. The lockable swivel caster wheels 46 are off-the-shelf items and various types of caster wheels may be used without departing from the spirit of the present invention.

In an effort to provide additional support for the platform assembly 14 in the area under the center of the central support platform 18, at least one nonlocking swivel caster wheel 48 may be utilized and is secured to the lower surface 28 of the central portion 22. The nonlocking swivel caster wheel 48 extends between the lower surface of the central portion and the surface upon which the heater dolly 10 is positioned to provide additional support in the center of the platform assembly 14. While a single nonlocking swivel caster wheel 48 is disclosed herein, it is appreciated, that no central casters may be utilized, or a plurality of nonlocking swivel caster wheels could be employed without departing from the spirit of the present invention.

In accordance with a disclosed embodiment, the central support platform 18 is constructed of molded plastic for strength, light weight, and low cost. As those skilled in the art will appreciate, the lower surface of the central support platform 18 may be constructed with a truss arrangement to enhance the strength of the central support platform 18. As to the arcuate anchoring members 20a-20e, they are also preferably constructed from molded plastic for strength, light weight, and low cost.

As mentioned above, the heater dolly 10 also includes a retention assembly 16 constructed to extend between the platform assembly 14 and the outdoor patio heater 100 in a manner providing additional support and ensuring that the outdoor patio heater 100 and platform assembly 14 are securely connected to enhance the stability of the outdoor patio heater 100 as it sits upon the heater dolly 10. The retention assembly 16 includes a collar member 50 shaped and dimensioned for secure attachment to the upwardly extending shaft 102 of the outdoor patio heater 100 in the area adjacent to the base 104 of the outdoor patio heater 100 and the platform assembly 14. The collar member 50 is constructed such that it is annular and includes an inner surface 52 that directly engages the shaft 102 of the outdoor patio heater 100 and an outer surface 54 facing away from the shaft 102 of the outdoor patio heater 100.

Figure 10:
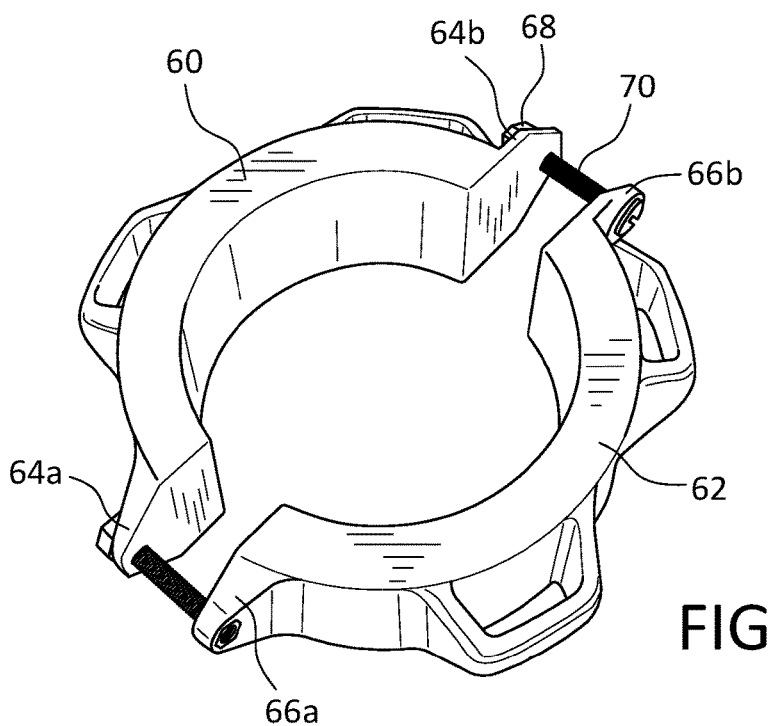
FIG. 10 is a perspective view of an alternate collar member.

The collar member 50 includes arcuate first and second collar segments 60, 62. Each of the first and second collar segments 60, 62 is provided with opposed end members 64a, 64b, 66a, 66b that mate with respective end members 64a, 64b, 66a, 66b of the other collar segment 60, 62 when the first and second collar segments 60, 62 are positioned about the shaft 102 of the outdoor patio heater 100. The opposed first end members 64a, 66a of the first and second collar segment 60, 62 are provided with respective nut 68 and bolt 70, while the opposed second end members 64b, 66b of the first and second collar segment 60, 62 are connected by a hinge 71. The opposed first end members 64a, 66a of the first and second collar segment 60, 62 are drawn together under the control of the nut and bolt 68, 70 that extend between the first end members 64a, 66a of the collar segments 60, 62. D-rings 72 are secured to the outer surface 54 of the first and second collar segments 60, 62 and provide a mounting structure for the straps 56 of the retention assembly 16. While a hinge 71 is disclosed above, it is appreciated the opposed second end members 64b', 66b' of the first and second collar segment 60', 62' could be connected by a nut and bolt 68', 70' arrangement similar to that disclosed in conjunction with the opposed first end members 64a', 66a' (see FIG. 10). In order to allow for attachment of five (5) straps 56 between the arcuate anchoring members 20a-20e and the collar member 50, the D-ring straddling the first and second collar segments 60, 62 at the first end members 64a, 66a is formed in two parts that are drawn together when the first end member 64a, 66a are brought together. It is also contemplated the first and second collar segments could be of different lengths such that two D-rings may be secured to the first collar segment and three D-rings may be secured to the second collar segment. As briefly discussed above, it is important that the collar member 50 securely engage the shaft 102 of the outdoor patio heater 100 and the inner surface 52 of the collar member 50 is of a diameter similar to, and slightly smaller than, the diameter of the shaft 102 of the outdoor patio heater 100. Further friction between the collar member 50 and the shaft 102 of the outdoor patio heater 100 may be achieved by positioning a rubber insert between the collar member 50 and the shaft 102 of the outdoor patio heater 100.

As briefly discussed above, the retention assembly 16 further includes a plurality of nylon straps 56 extending from the outer surface 54 of the collar member 50. Each of the plurality of straps 56 includes a first end 58 secured to the collar member 50 and a second end 59 adapted for attachment to, and adjustment relative to, the arcuate anchoring members 20a-20e. The first ends 58 of each of the plurality of straps 56 are secured to D-rings 72 extending from the outer surface 54 of the collar member 50. Each of the straps 56 includes a mechanism that allows the effective length of the strap 56 to be selectively shortened to pull the collar member 50 down toward the platform assembly 14 and hold the base 104 of the outdoor patio heater 100 securely in place. The mechanism shown in the disclosed embodiment is generically a length adjustment buckle 78 of any of a variety of commonly available constructions. For example, it could be a ratcheting buckle or a spring-loaded buckle commonly used with lashing straps. In accordance with other embodiments, the straps could be replaced with conventional or rubber bungee cords. The straps could also constructed from a single strap member with a first end having a spring-biased buckle and a free second end shaped and dimensioned to pass through the buckle, wherein the free second end of the strap member is passed about the arcuate anchoring member, through the D-ring, and is then passed through and locked relative to the buckle to adjust the length of the strap extending between the collar member and the arcuate anchoring member. While spring-biased buckles are disclosed above, it is appreciated various buckle arrangements could be used in accordance with the present invention.

As it is desirable for the quick disconnection of at least one strap 56 adjacent to the compartment in which the propane tank is stored the first end of the at least one strap 56 is preferably secured to the D-ring 72 via a quick connection member, for example, a carabineer 73.

In practice, the outdoor patio heater without its propane tank is lifted onto the platform assembly 14. The retention assembly 16 is then secured between shaft 102 of the outdoor patio heater 100 and the arcuate anchoring members 20a-20e.

With the heater dolly 10, moving the outdoor patio heater 100 around a deck is simple. Simply push or pull the entire outdoor patio heater 100 next to the picnic table or the chaise lounges. Simply engage the locks of the caster wheels 46 and the outdoor patio heater 100 stays put until you decide to move it again. The customer gets much more use from their investment and because the heater sits on wheels, the deck remains cleaner and free from staining from an immovable base 104. Moving the heater for deck cleaning is significantly easier and safer. The outdoor patio heater 100 can simply and safely be moved out of the way when not in use.

The heater dolly 10 provides anti-tip technology by enhancing leverage to lower the incidence of dangerous tipping of the outdoor patio heater 100 during movement. At best, some patio heaters have two side-mounted wheels to accommodate the heater being moved by tilting the entire heater in the direction of the wheels with the pole typically serving at the rudder for awkward and potentially dangerous movement of the heater. Often, heaters are extremely hot at the top when moved, making that system extremely dangerous to all involved or nearby. Further, the heater dolly 10 includes its caster wheels 46 extending beyond the limits of the heater's base 104 to provide increased leverage against tipping. This may make the outdoor patio heater 100 even more stable than if the base 104 was just sitting on the deck.

The retention assembly 16 includes a collar member 50 bolted around the main heater shaft 102 with hooks for heavy-duty straps to connect to the retention assembly 16 between each wheel location. This lessens tilting as the heater is moved because the entire system becomes one unit. This too provides greater safety and security than the original heaters as discussed above.

Heavy heaters often remain in place on a deck, making the area very difficult to clean well. Unsanitary dirt and rot under the base 104 create a terrible stain which will be revealed when the heater base 104 is removed in the future. The heater dolly 10 sits on caster wheels so that the deck underneath the base 104 is open and with the ability to move the outdoor patio heater 100 for deck cleaning via the heater dolly 10, the deck remains clean, sanitary, and unstained.

As briefly mentioned above, the standard heater dolly 10 preferably has a diameter of at least 22 inches to accommodate most large heaters. The heater dolly 10 has wheels around the exterior.

While the preferred embodiments have been shown and described, it will be understood that there is no intent to limit the invention by such disclosure, rather, is intended to cover all modifications and alternate constructions falling within the spirit and scope of the invention.

The invention claimed is:

1. A dolly, comprising:
  a platform assembly including a central support platform with a series of anchoring members; and
  a retention assembly selectively engaging with the series of anchorin, embers, the retention assembly constructed to extend between the platform assembly and an outdoor patio heater positioned on the platform assembly in a manner providing additional support and ensuring that the outdoor patio heater and platform assembly are securely connected to enhance stability of the outdoor patio heater as it sits upon the dolly, the retention assembly includes members shaped and dimensioned for secure attachment to the outdoor patio heater and a plurality of straps shaped and dimensioned for selective attachment to the anchoring members and the outdoor patio heater, each of the plurality of straps includes a length adjustment mechanism allowing an effective length of the strap to be selectively shortened to secure the outdoor patio heater in place.

2. The dolly according to claim 1, wherein the central support platform includes a downwardly extending lockable caster wheels secured to the lower surface thereof.

3. The dolly according to claim 2, wherein at least one nonlocking swivel caster wheel is secured to the lower surface of the central support platform.

4. The dolly according to claim 1, wherein the central support platform includes an upper surface, a lower surface, and a sidewall extending between the upper surface and the lower surface.

5. The dolly according to claim 1, wherein the central support platform is of a one-piece construction.

6. The dolly according to claim 1, wherein the central support platform includes a substantially circular central portion from which a plurality of support arms, which have a triangular shape, extend.

7. The dolly according to claim 1, wherein the retention assembly includes a collar member shaped and dimensioned for secure attachment to the outdoor patio heater and the platform assembly.

8. The dolly according to claim 7, wherein the collar member is annular and includes an inner surface that directly engages the outdoor patio heater and an outer surface facing away from the outdoor patio heater.

9. The dolly according to claim 8, wherein the collar member includes arcuate first and second collar segments, each of the first and second collar segments is provided with opposed end members that mate with respective end members of the other collar segment when the first and second collar segments are positioned about the outdoor patio heater.

10. The dolly according to claim 7, wherein the retention assembly further includes a plurality of straps extending from an outer surface of the collar member.

* * * * *